US011022855B2

(12) United States Patent
Park et al.

(10) Patent No.: US 11,022,855 B2
(45) Date of Patent: Jun. 1, 2021

(54) BEAM SCANNING APPARATUS AND OPTICAL APPARATUS INCLUDING THE SAME

(71) Applicant: SAMSUNG ELECTRONICS CO., LTD., Suwon-si (KR)

(72) Inventors: Junghyun Park, Seoul (KR); Changgyun Shin, Anyang-si (KR); Byounglyong Choi, Seoul (KR); Seunghoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 432 days.

(21) Appl. No.: 16/023,641

(22) Filed: Jun. 29, 2018

(65) Prior Publication Data
US 2019/0079367 A1 Mar. 14, 2019

(30) Foreign Application Priority Data
Sep. 13, 2017 (KR) .................. 10-2017-0117235

(51) Int. Cl.
*G02F 1/00* (2006.01)
*G01S 7/48* (2006.01)
(Continued)

(52) U.S. Cl.
CPC ............ *G02F 1/292* (2013.01); *G01S 7/4817* (2013.01); *G01S 17/931* (2020.01); *G02F 1/291* (2021.01)

(58) Field of Classification Search
USPC ....................................................... 356/4.01
See application file for complete search history.

(56) References Cited

U.S. PATENT DOCUMENTS 4,279,510 A * 7/1981 Brown .................. G01J 1/44
250/207
4,686,693 A * 8/1987 Ritter .................. G10K 11/175
381/73.1
(Continued)

FOREIGN PATENT DOCUMENTS

| EP | 3 293 570 A1 | 3/2018 |
| GB | 1155434 | 6/1969 |
| KR | 10-2017-0068372 A | 6/2017 |

OTHER PUBLICATIONS

Yao-Wei Huang et al., "Gate-tunable conducting oxide metasurfaces", Nano Letters, vol. 16, No. 9, Aug. 26, 2016, pp. 5319-5325.
(Continued)

*Primary Examiner* — James R Hulka
(74) *Attorney, Agent, or Firm* — Sughrue Mion, PLLC

(57) ABSTRACT

A beam scanning apparatus and an optical apparatus including the same are provided. The beam scanning apparatus includes a first antenna group including a plurality of first nano antennas disposed apart from each other, a first driving voltage line and a second driving voltage line connected to a first nano antenna and a second nano antenna, respectively, among the plurality of first nano antennas, the first nano antenna and the second nano antenna being respectively disposed at first ends within the first antenna group, and a first voltage divider configured to distribute a plurality of first voltages to one or more first middle nano antennas disposed between the first nano antenna and the second nano antenna, among the plurality of first nano antennas, at regular voltage intervals.

22 Claims, 11 Drawing Sheets

(51) Int. Cl.
*G02F 1/29* (2006.01)
*G01S 7/481* (2006.01)
*G01S 17/931* (2020.01)

(56) References Cited

U.S. PATENT DOCUMENTS

| | | | | |
|---|---|---|---|---|
| 8,462,334 | B2* | 6/2013 | Lu | B82Y 30/00 |
| | | | | 356/301 |
| 9,244,268 | B2* | 1/2016 | Long | G02F 1/011 |
| 9,632,216 | B2* | 4/2017 | Han | G02F 1/292 |
| 9,825,712 | B2* | 11/2017 | Akyildiz | H01L 29/20 |
| 10,274,756 | B2* | 4/2019 | Kim | G02F 1/0009 |
| 10,761,351 | B2* | 9/2020 | Lee | G01S 17/06 |
| 10,788,725 | B2* | 9/2020 | Lee | G02B 26/06 |
| 2010/0284016 | A1* | 11/2010 | Teitell | G01J 3/453 |
| | | | | 356/451 |
| 2012/0050732 | A1* | 3/2012 | Lu | B82Y 20/00 |
| | | | | 356/301 |
| 2012/0155168 | A1* | 6/2012 | Kim | G11C 11/5628 |
| | | | | 365/185.03 |
| 2014/0036262 | A1* | 2/2014 | Wang | G01N 21/658 |
| | | | | 356/301 |
| 2014/0224989 | A1 | 8/2014 | Long et al. | |
| 2016/0139266 | A1* | 5/2016 | Montoya | G01S 17/32 |
| | | | | 356/5.01 |
| 2016/0218429 | A1 | 7/2016 | Klemes | |
| 2016/0223723 | A1 | 8/2016 | Han et al. | |
| 2016/0323041 | A1 | 11/2016 | Akyildiz et al. | |
| 2017/0168324 | A1 | 6/2017 | Kim et al. | |
| 2018/0059444 | A1 | 3/2018 | Lee et al. | |
| 2018/0074382 | A1* | 3/2018 | Lee | G02F 1/292 |

OTHER PUBLICATIONS

Junghyun Park et al., "Dynamic Reflection Phase and Polarization Control in Metasurfaces", Nano Letters, vol. 17, American Chemical Society, Dec. 5, 2016, pp. 407-413.

Communication dated Jan. 23, 2019, issued by the European Patent Office in counterpart European Application No. 18186098.2.

* cited by examiner ly, advanced driving assistance systems (ADASs) having various functions have been commercialized. For example, vehicles having functions, such as adaptive cruise control (ACC) and autonomous emergency braking (AEB), have increased. ACC is characterized in that a location and a speed of other vehicles are recognized; when there is a risk of collision, the speed of a vehicle is decreased, and when there is no risk of collision, the vehicle is driven within a pre-set speed range. AEB is characterized in that when a front vehicle is recognized and there is a risk of collision, but a driver does not react to this situation or reacts inappropriately, autonomous braking is performed to prevent the

BEAM SCANNING APPARATUS AND OPTICAL APPARATUS INCLUDING THE SAME

CROSS-REFERENCE TO RELATED APPLICATION

This application claims priority from Korean Patent Application No. 10-2017-0117235, filed on Sep. 13, 2017, in the Korean Intellectual Property Office, the disclosure of which is incorporated herein by reference in its entirety.

BACKGROUND

1. Field

Apparatuses consistent with example embodiments relate to a beam scanning apparatus and an optical apparatus including the same, and more particularly, to a beam scanning apparatus having enhanced light usage efficiency by increasing a main lobe component of a radiated beam, and an optical apparatus capable of extracting information about an external object by sensing light reflected by the external light.

2. Description of the Related Art

Recently, advanced driving assistance systems (ADASs) having various functions have been commercialized. For example, vehicles having functions, such as adaptive cruise control (ACC) and autonomous emergency braking (AEB), have increased. ACC is characterized in that a location and a speed of other vehicles are recognized; when there is a risk of collision, the speed of a vehicle is decreased, and when there is no risk of collision, the vehicle is driven within a pre-set speed range. AEB is characterized in that when a front vehicle is recognized and there is a risk of collision, but a driver does not react to this situation or reacts inappropriately, autonomous braking is performed to prevent the collision. Moreover, it is expected that vehicles capable of autonomous driving will be commercialized in the near future.

Accordingly, interest in optical measuring apparatuses for providing information regarding a vehicle's surroundings has increased. For example, vehicle light detection and ranging (LiDAR) apparatuses may provide information about a distance between a vehicle and an object near the vehicle, a relative speed, an azimuth, etc. by radiating a laser beam toward a selected area around the vehicle and detecting a reflected laser beam. To this end, vehicle LiDAR apparatuses include a beam scanning device for scanning a desired area with light. In addition to vehicle LiDAR apparatuses, the beam scanning apparatus may also be used in robot LiDAR apparatuses, drone LiDAR apparatuses, security intruder detection systems, subway screen door obstacle detection systems, depth sensors, user face recognition sensors in mobile phones, augmented reality (AR), and motion recognition and object profiling in TVs and entertainment devices.

Beam scanning apparatuses are mainly classified into mechanical beam scanning apparatuses and non-mechanical beam scanning apparatuses. For example, mechanical beam scanning apparatuses use a method of rotating a light source itself, a method of rotating a mirror that reflects light, and/or a method of moving a spherical lens in a direction perpendicular to an optical axis. Non-mechanical beam scanning apparatuses use a method using a semiconductor device and/or a method of electrically controlling the angle of reflected light by using a plurality of micro antenna arrays.

SUMMARY

According to an aspect of an example embodiment, there is provided a beam scanning apparatus including a first antenna group including a plurality of first nano antennas disposed apart from each other, a first driving voltage line and a second driving voltage line connected to a first nano antenna and a second nano antenna, respectively, among the plurality of first nano antennas, the first nano antenna and the second nano antenna being respectively disposed at first ends within the first antenna group, and a first voltage divider configured to distribute a plurality of first voltages to one or more first middle nano antennas disposed between the first nano antenna and the second nano antenna, among the plurality of first nano antennas, at regular voltage intervals.

The first voltage divider may include a plurality of resistors serially connected to each other and connected to the first driving voltage line and the second driving voltage line, the plurality of resistors being disposed between the first driving voltage line and the second driving voltage line, and one or more voltage dividing lines, each of the one or more voltage dividing lines being connected from a node between two adjacent resistors, among the plurality of resistors, to a respective one of the one or more first middle nano antennas.

Each of the plurality of resistors may have a same resistance value.

The first driving voltage line may be configured to provide a first voltage to the first nano antenna, the second driving voltage line may be configured to provide a second voltage to the second nano antenna, and the first voltage divider may be configured to distribute the plurality of first voltages between the first voltage and the second voltage to the one or more first middle nano antennas at the regular voltage intervals.

The beam scanning apparatus may further include a driving control circuit configured to determine first magnitudes of the first voltage and the second voltage to be respectively applied to the first driving voltage line and the second driving voltage line, based on a direction in which a beam is to be radiated, and apply the first voltage and the second voltage of which the first magnitudes are determined, to the first driving voltage line and the second driving voltage line, respectively.

The beam scanning apparatus may further include a second antenna group including a plurality of second nano antennas disposed apart from each other, a third driving voltage line and a fourth driving voltage line connected to a third nano antenna and a fourth nano antenna, respectively, among the plurality of second nano antennas, the third nano antenna and the fourth nano antenna being respectively disposed at second ends within the second antenna group, and a second voltage divider configured to distribute a plurality of second voltages to one or more second middle nano antennas disposed between the third nano antenna and the fourth nano antenna, among the plurality of second nano antennas, at the regular voltage intervals.

The first antenna group and the second antenna group may constitute a unit cell configured to change a phase of incident light.

The driving control circuit may be further configured to determine second magnitudes of a third voltage and a fourth voltage to be respectively applied to the third driving voltage line and the fourth driving voltage line, based on the direction in which the beam is to be radiated, and apply the third voltage and the fourth voltage of which the second magnitudes are determined, to the third driving voltage line and the fourth driving voltage line, respectively. A distribution of all voltages that are applied to the plurality of first nano antennas within the first antenna group and the plurality of second nano antennas within the second antenna group may have consecutive linearity.

The beam scanning apparatus may further include a third antenna group including a plurality of third nano antennas disposed apart from each other, a fifth driving voltage line and a sixth driving voltage line connected to a fifth nano antenna and a sixth nano antenna, respectively, among the plurality of third nano antennas, the fifth nano antenna and the sixth nano antenna being respectively disposed at third ends within the third antenna group, a third voltage divider configured to distribute a plurality of third voltages to one or more third middle nano antennas disposed between the fifth nano antenna and the sixth nano antenna, among the plurality of third nano antennas, at the regular voltage intervals, a fourth antenna group including a plurality of fourth nano antennas disposed apart from each other, a seventh driving voltage line and an eighth driving voltage line connected to a seventh nano antenna and an eighth nano antenna, respectively, among the plurality of fourth nano antennas, the seventh nano antenna and the eighth nano antenna being respectively disposed at fourth ends within the fourth antenna group, and a fourth voltage divider configured to distribute a plurality of fourth voltages to one or more fourth middle nano antennas disposed between the seventh nano antenna and the eighth nano antenna, among the plurality of fourth nano antennas, at the regular voltage intervals.

The third antenna group and the fourth antenna group may constitute a unit cell configured to change a phase of incident light.

The driving control circuit may be further configured to apply the first voltage and the second voltage of which the first magnitudes are determined, to the fifth driving voltage line and the sixth driving voltage line, respectively, and apply the third voltage and the fourth voltage of which the second magnitudes are determined, to the seventh driving voltage line and the eighth driving voltage line, respectively.

The beam scanning apparatus may further include a conductor layer, an active layer disposed on the conductor layer, and an insulation layer disposed on the active layer. The plurality of first nano antennas may be disposed on the insulation layer.

A width of each of the plurality of first nano antennas may be less than an operating wavelength of incident light.

According to an aspect of another example embodiment, there is provided an optical apparatus including a light source configured to emit first light, a beam scanning apparatus configured to radiate the first light that is emitted, to an external object, and a photodetector configured to sense second light that is reflected by the external object to which the first light is radiated. The beam scanning apparatus includes a first antenna group including a plurality of first nano antennas disposed apart from each other, a first driving voltage line and a second driving voltage line connected to a first nano antenna and a second nano antenna, respectively, among the plurality of first nano antennas, the first nano antenna and the second nano antenna being respectively disposed at first ends within the first antenna group, and a first voltage divider configured to distribute a plurality of first voltages to one or more first middle nano antennas disposed between the first nano antenna and the second nano antenna, among the plurality of first nano antennas, at regular voltage intervals.

The optical apparatus may further include a controller configured to determine information of a location of the external object, based on a result of a measurement of the second light that is sensed, the measurement being performed by the photodetector.

According to an aspect of another example embodiment, there is provided a beam scanning apparatus including a plurality of nano antennas disposed apart from each other, a first driving voltage line connected to a first nano antenna among the plurality of nano antennas, and configured to provide a first voltage to the first nano antenna, a second driving voltage line connected to a second nano antenna among the plurality of nano antennas, and configured to provide a second voltage to the second nano antenna, and a voltage divider disposed between the first driving voltage line and the second driving voltage line and connected to the first driving voltage line and the second driving voltage line, the voltage divider being configured to provide a third voltage to a middle nano antenna disposed between the first nano antenna and the second nano antenna, among the plurality of nano antennas. Magnitudes of the first voltage, the second voltage and the third voltage that are provided are linearly decreasing from the first voltage to the third voltage.

A phase shift of light incident on the beam scanning apparatus may linearly decrease according to a position of the plurality of nano antennas.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
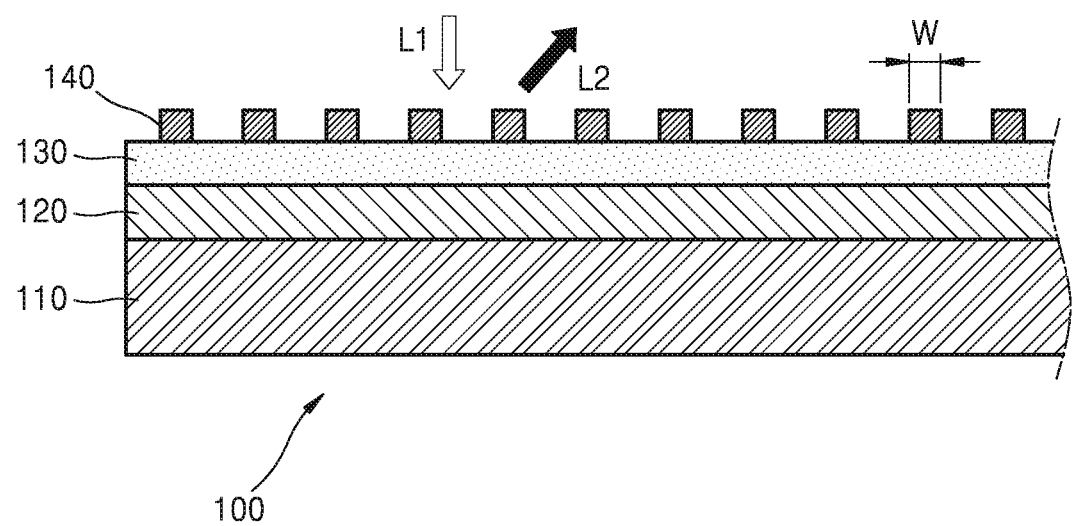
FIG. 1 is a schematic cross-sectional view of a beam scanning apparatus according to an example embodiment.

A beam scanning apparatus and optical apparatus including the same will now be described in detail with reference to the accompanying drawings. Like reference numerals in the drawings denote like elements, and, in the drawings, the sizes of elements may be exaggerated for clarity and for convenience of explanation. In this regard, example embodiments may have different forms and may not be construed as being limited to the descriptions set forth herein. It will be understood that when a layer is referred to as being "on" another layer or substrate, it can be directly on/below/on the left side of/on the right side of the other layer or substrate, or intervening layers may also be present.

FIG. 1 is a schematic cross-sectional view of a beam scanning apparatus 100 according to an example embodiment. Referring to FIG. 1, the beam scanning apparatus 100 according to an example embodiment may include a conductor layer 110 serving as a common electrode, an active layer 120 disposed on the conductor layer 110, an insulation layer 130 disposed on the active layer 120, and a plurality of nano antennas 140 disposed apart from each other at regular intervals on the insulation layer 130.

The conductor layer 110 may serve as a common electrode and may be formed of a conductive material. For example, the conductor layer 110 may include copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), gold (Au) or an alloy thereof, a metal nanoparticle dispersion thin film (such as Au or Ag), a carbon nanostructure (such as carbon nanotubes (CNTs) or graphene), or a conductive polymer (such as poly(3,4-ethylenedioxythiophene) (PEDOT), polypyrrole (PPy), or poly(3-hexylthiophene) (P3HT)).

The nano antennas 140 serve as antennas with respect to light, and may provoke localized surface plasmon resonance with respect to light having a wavelength to thereby capture and emit energy of the localized surface plasmon resonance. The localized surface plasmon resonance is a phenomenon that a greatly increased electric field is locally generated on a metal surface according to a phenomenon that free electrons within metal collectively oscillate when light is incident upon the metal. The localized surface plasmon resonance may be generated at the interface between metal and non-metal. To this end, the nano antennas 140 may include a metal material having high conductivity, such as Au, Ag, Cu, Al, or Pt.

Sizes and shapes of the nano antennas 140 may vary according to operating wavelengths. For example, a width W of each of the nano antennas 140 may be less than an operating wavelength. For example, when an operating wavelength is a visible light wavelength or a near infrared light wavelength, the width W of each of the nano antennas 140 may be about 400 nm or less. Each of the nano antennas 140 may have a bar shape, or may have any of various shapes, such as a circle, an oval, and a cross.

The active layer 120 changes resonance characteristics in the nano antennas 140 while a charge density within the active layer 120 is being changed by an electric signal, for example, an electric field formed between the conductor layer 110 and the nano antennas 140. For example, the active layer 120 may include a crystalline material (such as, potassium tantalate niobate (KTN), $LiNbO_3$, or lead zirconate titanate (PZT)), a ZnO-based oxide (such as, indium tin oxide (ITO), indium zinc oxide (IZO), aluminum zinc oxide (AZO), gallium zinc oxide (GZO), or gallium indium zinc oxide (GIZO), a transition metal nitride (such as, TiN, ZrN, HfN, or TaN), or a semiconductor material (such as, Si, a-Si, a Groups III-IV elements-containing compound semiconductor). Although the single active layer 120 is illustrated in FIG. 1, the active layer 120 may also be patterned similar to the nano antennas 140.

The insulation layer 130 electrically insulates the nano antennas 140 from the active layer 120 and the conductor layer 110. For example, the insulation layer 130 may include $SiO_2$, or may include a material having a high dielectric constant, such as $Al_2O_3$ or $HfO_2$.

In the beam scanning apparatus 100 having this structure, the charge density within the active layer 120 varies according to the intensity of the electric field between the conductor layer 110 and the nano antennas 140. Because a common voltage is applied to the conductor layer 110, a charge density distribution within the active layer 120 may change, according to a distribution of voltages applied to the plurality of nano antennas 140. The charge density change within the active layer 120 may change the resonance characteristics in the nano antennas 140, and the changed resonance characteristics may cause a phase shift of light reflected by the nano antennas 140 to thereby change the phase of the reflected light. Accordingly, a phase shift distribution of the reflected light depends on the distribution of the voltages applied to the plurality of nano antennas 140 disposed adjacent to each other, and thus a traveling direction of the reflected light may be controlled by adjusting the voltages applied to the plurality of nano antennas 140. In this manner, the beam scanning apparatus 100 may reflect incident light L1 and may radiate reflected light L2 in a desired direction.

Figure 2:
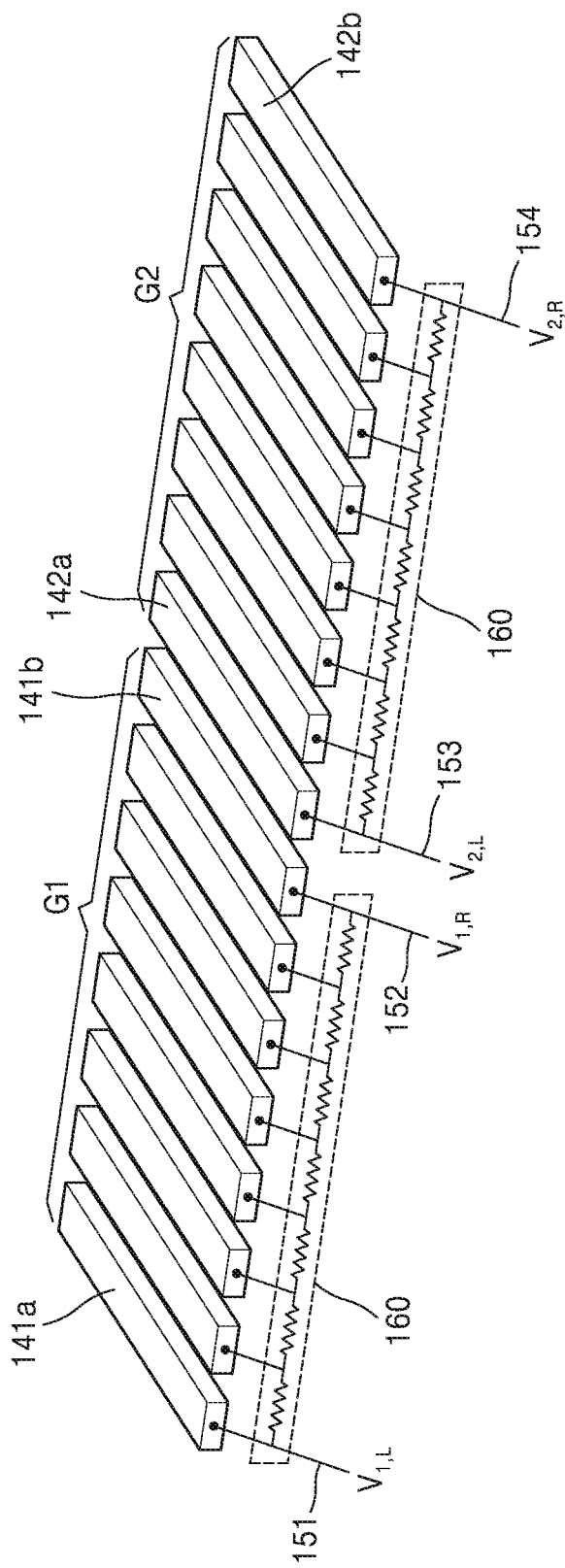
FIG. 2 is a schematic conceptual diagram of a structure for distributing voltages to a plurality of nano antennas in a beam scanning apparatus, according to an example embodiment.

FIG. 2 is a schematic conceptual diagram of a structure for distributing voltages to the plurality of nano antennas 140 in the beam scanning apparatus 100, according to an example embodiment. Referring to FIG. 2, the plurality of nano antennas 140 disposed adjacent to each other may constitute at least one antenna group G1 and/or G2. Although each of first and second antenna groups G1 and G2 includes eight nano antennas 140 in FIG. 2, example embodiments are not limited thereto. The beam scanning apparatus 100 may include, for example, 10,000 or more nano antennas 140, and the number of antenna groups and the number of nano antennas 140 that constitute a single antenna group may be determined in design.

The beam scanning apparatus 100 may further include two driving voltage lines electrically connected to two nano antennas 140, respectively, disposed on both ends of each of the first and second antenna groups G1 and G2, respectively. For example, a first driving voltage line 151 is electrically connected to a first nano antenna 141a disposed on the leftmost side among the plurality of nano antennas 140 included in the first antenna group G1, and a second driving voltage line 152 is electrically connected to a second nano antenna 141b disposed on the rightmost side among the plurality of nano antennas 140 included in the first antenna group G1. A third driving voltage line 153 is electrically connected to a third nano antenna 142a disposed on the leftmost side among the plurality of nano antennas 140 included in the second antenna group G2, and a fourth driving voltage line 154 is electrically connected to a fourth nano antenna 142b disposed on the rightmost side among the plurality of nano antennas 140 included in the second antenna group G2. Voltages $V_{1L}$, $V_{1R}$, $V_{2L}$ and $V_{2R}$ are applied to the first driving voltage line 151, the second driving voltage line 152, the third driving voltage line 153 and the fourth driving voltage line 154, respectively.

The beam scanning apparatus 100 may further include a voltage divider 160 connected between two driving voltage lines within each of the antenna groups G1 and G2. For example, a voltage divider 160 may be disposed between the first driving voltage line 151 and the second driving voltage line 152 within the first antenna group G1, and another voltage divider 160 may be disposed between the third driving voltage line 153 and the fourth driving voltage line 154 within the second antenna group G2. The voltage divider 160 distributes and applies voltages to middle nano antennas 140 disposed in the middle of each of the antenna groups G1 and G2 at regular voltage intervals. For example, the voltage divider 160 disposed in the first antenna group G1 distributes voltages to nano antennas 140 disposed between the first nano antenna 141a and the second nano antenna 141b, and the voltage divider 160 disposed in the second antenna group G2 distributes voltages to nano antennas 140 disposed between the third nano antenna 142a and the fourth nano antenna 142b.

Figure 3:
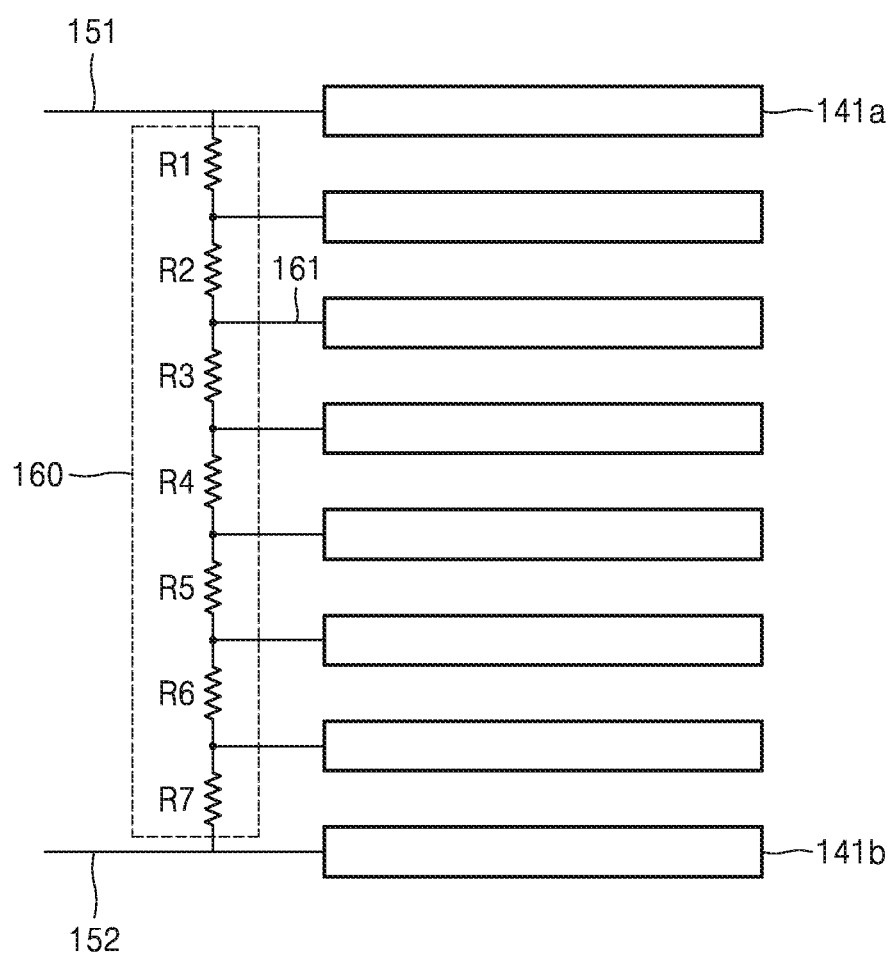
FIG. 3 is a circuit diagram of a structure of a voltage divider illustrated in FIG. 2.

FIG. 3 is a circuit diagram of a structure of the voltage divider 160 illustrated in FIG. 2. Referring to FIG. 3, the voltage divider 160 may include a plurality of resistors R1 through R7 serially connected between the first driving voltage line 151 and the second driving voltage line 152, and voltage dividing lines 161 electrically connected from respective nodes between two adjacent resistors to middle nano antennas 140, respectively, the plurality of resistors R1 through R7 and the voltage dividing lines 161 being disposed between the first nano antenna 141a and the second nano antenna 141b. For example, when the first antenna group G1 includes eight nano antennas 140, the voltage divider 160 may include seven resistors R1 through R7 and six voltage dividing lines 161. If the first antenna group G1 includes only three nano antennas 140, the voltage divider 160 may include two resistors and one voltage dividing line 161. In other words, the number of resistors included in the voltage divider 160 is one less than the number of nano antennas allocated to each antenna group, and the number of voltage dividing lines 161 included in the voltage divider 160 is two less than the number of nano antennas allocated to each antenna group.

When all of the plurality of resistors R1 through R7 serially connected to each other have the same resistance values, voltages may be distributed and applied to the nano antennas 140 allocated to each antenna group, at regular voltage intervals. For example, when a voltage of 4.0 V is applied to the first driving voltage line 151 and a voltage of 0.5 V is applied to the second driving voltage line 152 within the first antenna group G1, 4.0 V, 3.5 V, 3.0 V, 2.5 V, 2.0 V, 1.5 V, 1.0 V, and 0.5 V may be sequentially applied to the first nano antenna 141a through to the second nano antenna 141b.

Figure 4:
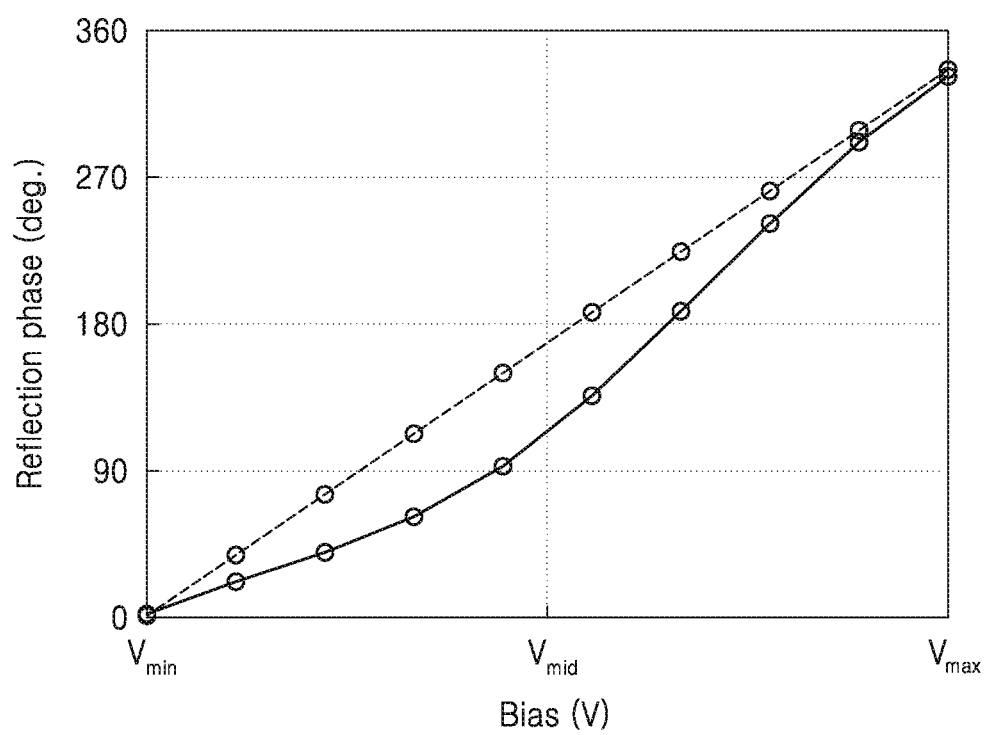
FIG. 4 is a graph showing a relationship between voltages applied to nano antennas and a phase shift of reflected light.

FIG. 4 is a graph showing a relationship between voltages applied to the nano antennas 140 and a phase shift of reflected light, according to an example embodiment. In FIG. 4, a dashed line indicates an ideal relationship, and a solid line indicates an actually-measured relationship. Referring to FIG. 4, there is a positive correlation between the voltages applied to the nano antennas 140 and the phase shift of the reflected light. Ideally, the voltages applied to the nano antennas 140 and the phase shift of the reflected light have a perfect linear relationship as indicated by the dashed line. However, in practice, as indicated by the solid line, a relationship between the voltages applied to the nano antennas 140 and the phase shift of the reflected light may be slightly different from the perfect linear relationship due to a process error, non-linearity of some materials, and/or the like. However, the voltages applied to the nano antennas 140 and the phase shift of the reflected light may have a linear relationship. Accordingly, when voltages are distributed to the nano antennas 140 allocated to each antenna group at regular voltage intervals, a phase shift of reflected light within each antenna group may gradually change. Via this consecutive phase shift of reflected light, a traveling direction of the reflected light may be controlled.

Figure 5:
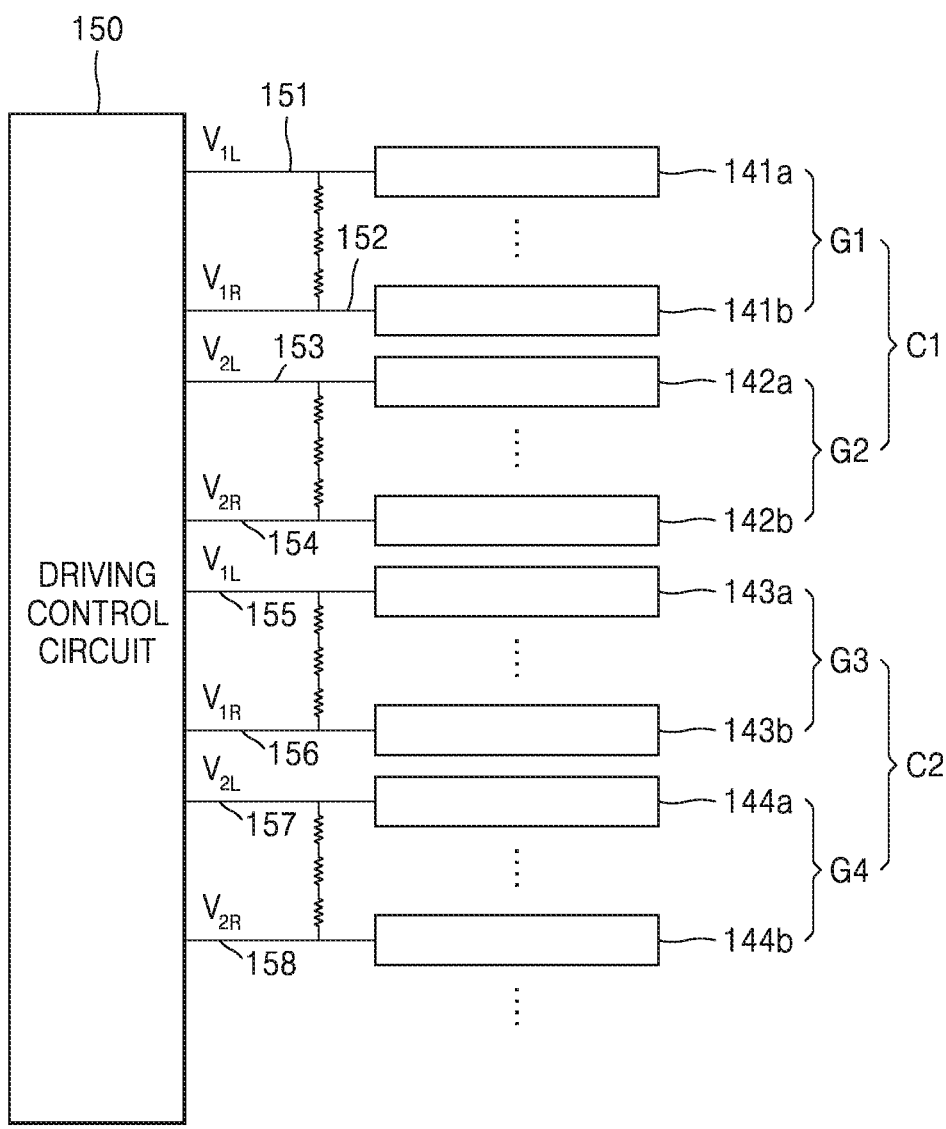
FIG. 5 is a block diagram of a driving circuit of a beam scanning apparatus, according to an example embodiment.

FIG. 5 is a block diagram of a driving circuit of the beam scanning apparatus 100, according to an example embodiment. Referring to FIG. 5, the first antenna group G1 and the second antenna group G2 may constitute a first cell C1, and a third antenna group G3 and a fourth antenna group G4 may constitute a second cell C2. Although only the first and second cells C1 and C2 are illustrated in FIG. 5, the beam scanning apparatus 100 may include a greatly large number of cells. These cells may become local unit pixels for scanning reflected light. For example, all of the nano antennas 140 within the first cell C1 may cooperate to reflect the reflected light in a direction, and all of the nano antennas 140 within the second cell C2 may cooperate to reflect the reflected light in a direction. All of the cells may operate to reflect the reflected light in the same direction at the same time.

The beam scanning apparatus 100 may include a driving control circuit 150 that provides driving voltages to the first, second, third, and fourth antenna groups G1, G2, G3, and G4, respectively. The driving control circuit 150 may determine the driving voltages that are respectively applied to the antenna groups G1, G2, G3, and G4, based on a direction in which a beam is to be radiated. For example, the driving control circuit 150 may apply a first voltage $V_{1L}$ to the first driving voltage line 151 of the first antenna group G1 and may apply a second voltage $V_{1R}$ to the second driving voltage line 152 of the first antenna group G1. Then, the first driving voltage line 151 provides the first voltage $V_{1L}$ to the first nano antenna 141a and the second driving voltage line 152 provides the second voltage $V_{1R}$ to the second nano antenna 141b. The voltage divider 160 distributes voltages between the first voltage $V_{1L}$ and the second voltage $V_{1R}$ to the middle nano antennas disposed between the first nano antenna 141a and the second nano antenna 141b, at regular voltage intervals.

The driving control circuit 150 may apply a third voltage $V_{2L}$ to the third driving voltage line 153 of the second antenna group G2 and may apply the fourth voltage $V_{2R}$ to a fourth driving voltage line 154 of the second antenna group G2. Then, the third driving voltage line 153 provides the third voltage $V_{2L}$ to the third nano antenna 142a, and the fourth driving voltage line 154 provides the fourth voltage $V_{2R}$ to the fourth nano antenna 142b. The voltage divider 160 distributes voltages between the third voltage $V_{2L}$ and the fourth voltage $V_{2R}$ to the middle nano antennas disposed between the third nano antenna 142a and the fourth nano antenna 142b, at regular voltage intervals. The driving control circuit 150 may determine the first through fourth voltages $V_{1L}$, $V_{1R}$, $V_{2L}$, and $V_{2R}$ such that the first antenna group G1 and the second antenna group G2 may cooperate to serve as the first cell C1, which changes a phase of incident light. In other words, the driving control circuit 150 may determine the first through fourth voltages $V_{1L}$, $V_{1R}$, $V_{2L}$, and $V_{2R}$ such that a distribution of voltages applied to the plurality of nano antennas 140 in the first antenna group G1 and the plurality of nano antennas 140 in the second antenna group G2 may have consecutive linearity. For example, when the first voltage $V_{1L}$ is 8.0 V, the second voltage $V_{1R}$ is 4.5 V, the third voltage $V_{2L}$ is 4.0 V, and the fourth voltage $V_{2R}$ is 0.5 V, a linear applied voltage distribution in which an applied voltage decreases by 0.5 V at a time from the first nano antenna 141a to the fourth nano antenna 142b in the first cell C1 may be obtained.

The driving control circuit 150 may apply the first voltage $V_{1L}$ to a fifth driving voltage line 155 of the third antenna group G3, may apply the second voltage $V_{1R}$ to a sixth driving voltage line 156 of the third antenna group G3, may apply the third voltage $V_{2L}$ to a seventh driving voltage line 157 of the fourth antenna group G4, and may apply the fourth voltage $V_{2R}$ to an eighth driving voltage line 158 of the fourth antenna group G4. Then, a fifth nano antenna 143a of the third antenna group G3 may be provided with the first voltage $V_{1L}$, a sixth nano antenna 143b thereof may be provided with the second voltage $V_{1R}$, a seventh nano antenna 144a of the fourth antenna group G4 may be provided with the third voltage $V_{2L}$, and an eighth nano antenna 144b thereof may be provided with the fourth voltage $V_{2R}$. The first through fourth voltages $V_{1L}$, $V_{1R}$, $V_{2L}$, and $V_{2R}$ applied to the third and fourth antenna groups G3 and G4 are the same as the first through fourth voltages $V_{1L}$, $V_{1R}$, $V_{2L}$, and $V_{2R}$ applied to the first and second antenna groups G1 and G2. Then, the third antenna group G3 and the fourth antenna group G4 may cooperate to serve as the second cell C2, which changes the phase of the incident light, and the first cell C1 and the second cell C2 may reflect the reflected light in the same direction.

Even when driving voltage lines are respectively connected to all of the nano antennas 140, an operation as described above may be performed. However, in this case, the driving control circuit 150 may have an increased size, power consumption may be increased, and costs for manufacturing the beam scanning apparatus 100 may be increased. However, the beam scanning apparatus 100 according to the present example embodiment is able to distribute and apply voltages to the plurality of nano antennas 140 disposed between the two driving voltage lines 151 and 152, the two driving voltage lines 153 and 154, the two driving voltage lines 155 and 156, and the two driving voltage lines 157 and 158, at regular voltage intervals by using the voltage divider 160. Thus, a number of the driving voltage lines 151, 152, 153, 154, 155, 156, 157, and 158 that is less than the total number of the nano antennas 140 may be used, and also different voltages may be respectively applied to a large number of the nano antennas 140. Consequently, the driving control circuit 150 for driving the beam scanning apparatus 100 may have reduced complexity, and may more easily drive the beam scanning apparatus 100.

In addition, because voltages are distributed and applied to the plurality of nano antennas 140 at regular voltage intervals, a phase shift of reflected light due to the plurality of nano antennas 140 within each of the cells C1 and C2 may have a consecutive phase shift distribution.

Figure 6:
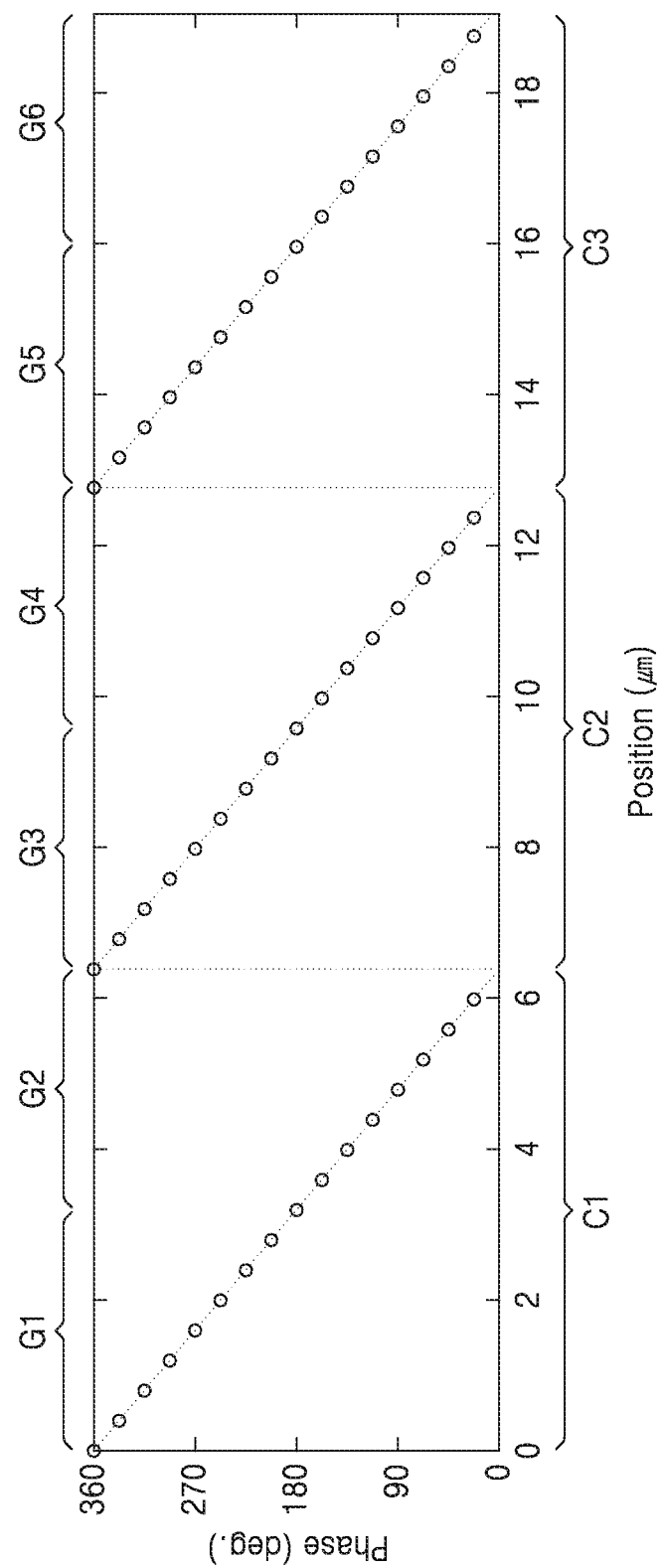
FIG. 6 is a graph showing phase shift distributions according to positions of a plurality of nano antennas in a beam scanning apparatus, according to an example embodiment.

FIG. 6 is a graph showing phase shift distributions according to positions of the plurality of nano antennas 140 in the beam scanning apparatus 100, according to an example embodiment. Referring to FIG. 6, respective phase shift distributions due to the first cell C1 including the first and second antenna groups G1 and G2, the second cell C2 including the third and fourth antenna groups G3 and G4, and a third cell C3 including fifth and sixth antenna groups G5 and G6 are the same. In each of the cells C1, C2, and C3, a phase shift distribution that is consecutive and linear at regular phase shift intervals may be obtained. In the respective phase shift distributions of the cells C1, C2, and C3, respective front halves thereof are contributed by the first, third, and fifth antenna groups G1, G3, and G5, and respective rear halves thereof are contributed by the second, fourth, and sixth antenna groups G2, G4, and G6.

For example, in the graph of FIG. 6, when sixteen nano antennas 140 are disposed within each of the cells C1, C2, and C3, a phase shift distribution having a phase interval of 22.5° from 360° to 22.5° may be obtained. A phase shift distribution from 360° to 202.5° is contributed by the first, third, and fifth antenna groups G1, G3, and G5, and a phase shift distribution from 180° to 22.5° is contributed by the second, fourth, and sixth antenna groups G2, G4, and G6. In this example, the reflected light may travel while being inclined rightwards by about 45° as illustrated in FIG. 1. However, the phase shift distributions shown in FIG. 6 are an example. The phase shift distributions due to the cells C1, C2, and C3 may vary according to the voltages applied to the driving voltage lines 151, 152, 153, 154, 155, 156, 157, and 158 by the driving control circuit 150 and the voltages respectively distributed to the nano antennas 140 by the voltage divider 160. For example, when the same voltage is applied to each of the driving voltage lines 151, 152, 153, 154, 155, 156, 157, and 158, a phase shift distribution may have a shape of a line parallel to the horizontal axis. In this case, the reflected light travels towards the front.

Figure 7:
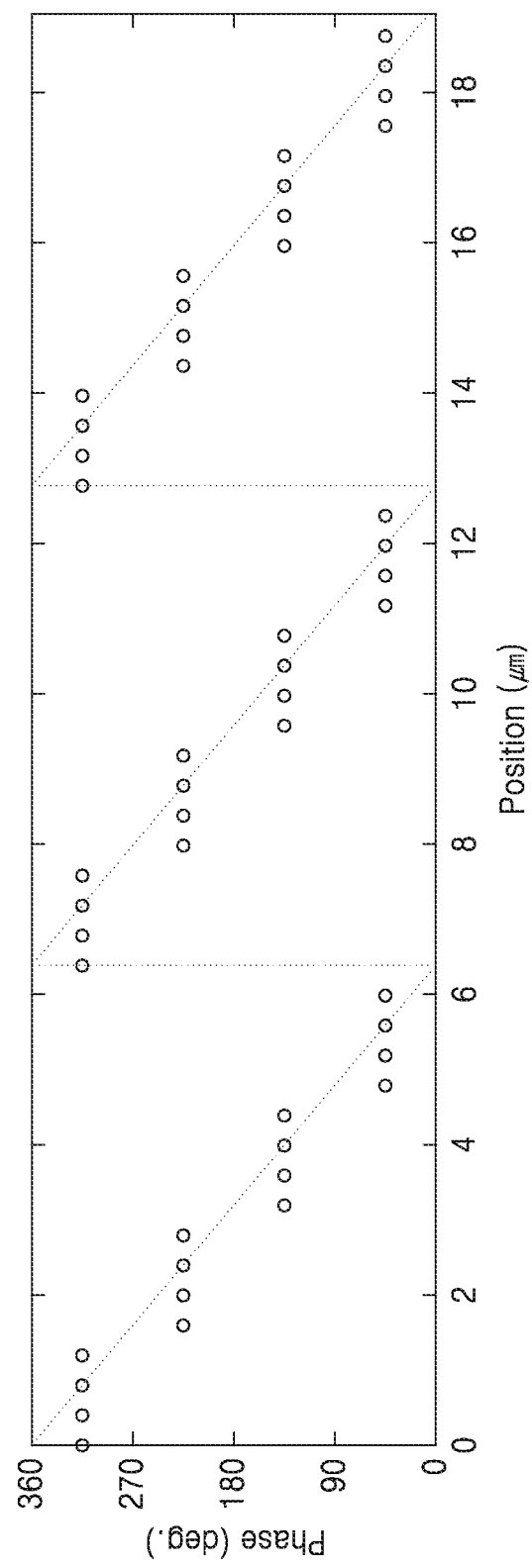
FIG. 7 is a graph showing phase shift distributions according to positions of a plurality of nano antennas in a beam scanning apparatus, according to a comparative example.

FIG. 7 is a graph showing phase shift distributions according to positions of a plurality of nano antennas in a beam scanning apparatus, according to a comparative example. In the beam scanning apparatus according to the comparative example, four nano antennas constitute a single antenna group, and four antenna groups constitute a single cell. The same voltage may be applied to all of the four nano antennas disposed in one antenna group, and voltages may be independently applied to antenna groups. In the comparative example, as shown in FIG. 7, a stepped phase shift distribution is formed because a middle phase is unable to be accomplished. Accordingly, accurate phase values are not expressed according to positions of nano antennas, and an approximate phase shift distribution is accomplished. When a middle-level phase is unable to be expressed as described above, a main lobe component of reflected light is reduced and a grating lobe component thereof is increased. Thus, light usage efficiency of the beam scanning apparatus according to the comparative example may be reduced.

Figure 8:
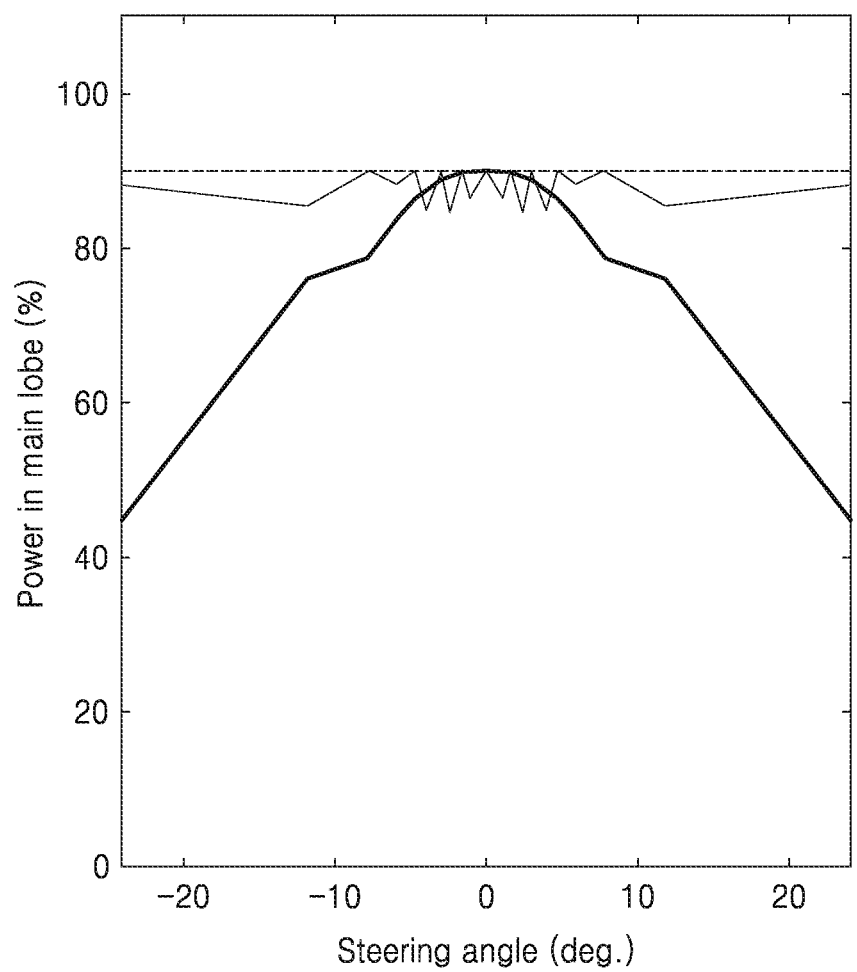
FIG. 8 is a graph showing power in a main lobe versus a steering angle of a beam.
Figure 9:
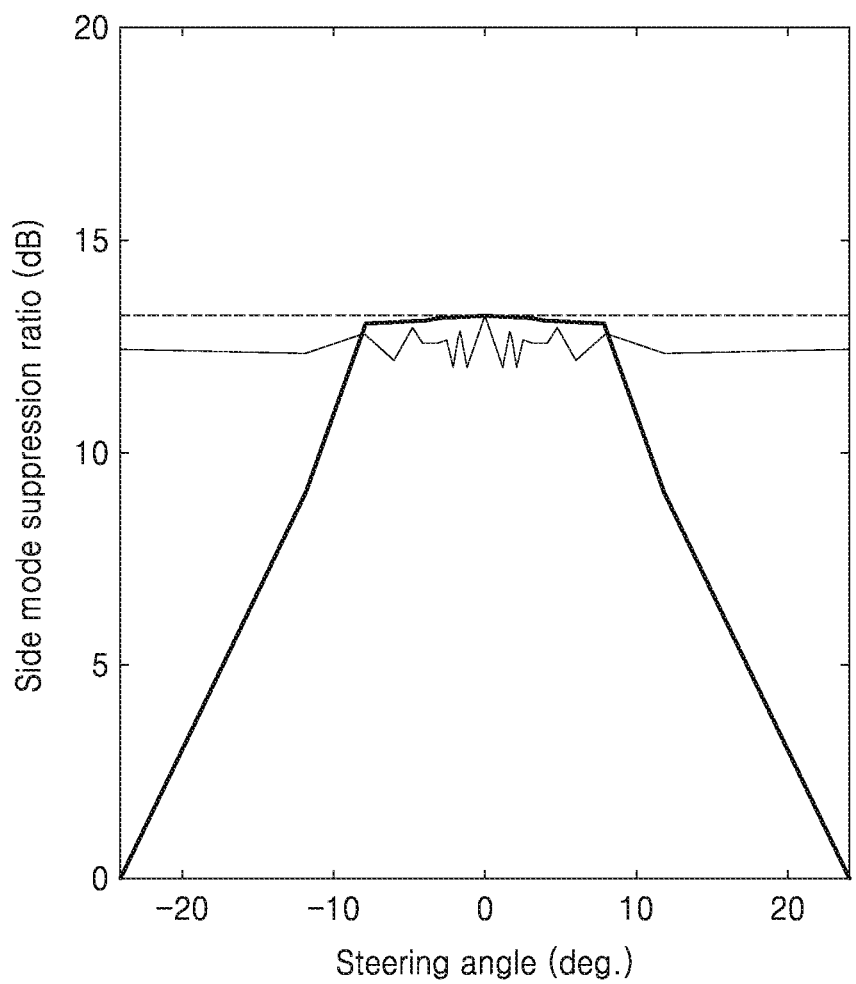
FIG. 9 is a graph showing a side mode suppression ratio (SMSR) versus a steering angle of a beam.
Figure 10:
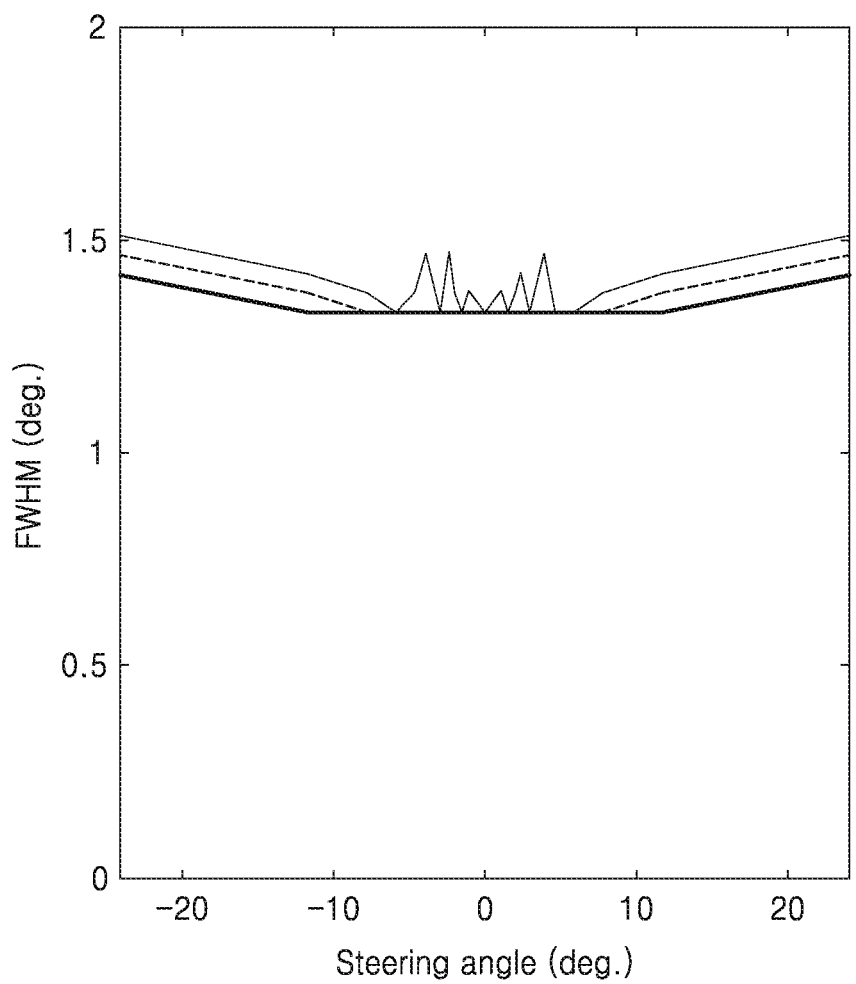
FIG. 10 is a graph showing a full width at half-maximum (FWHM) versus a steering angle of a beam.

FIG. 8 is a graph showing power in a main lobe versus a steering angle of a beam, FIG. 9 is a graph showing a side mode suppression ratio (SMSR) versus a steering angle of a beam, and FIG. 10 is a graph showing a full width at half-maximum (FWHM) versus a steering angle of a beam. The graph of each of FIGS. 8 through 10 shows a comparison between a comparative example, the present example embodiment, and an ideal example. For example, dashed lines of FIGS. 8 through 10 indicate ideal cases each having a perfectly-consecutive phase shift distribution, thin solid lines thereof indicate the present example embodiment, and thick solid lines thereof indicate comparative examples.

First, referring to FIG. 8, in an ideal case, power in a main lobe is constant regardless of a steering angle of reflected light. However, in a comparative example, as the steering angle of the reflected light increases, the power in a main lobe is remarkably decreased. In the present example embodiment, even when the steering angle of the reflected light increases, the power in a main lobe does not greatly drop, compared with the ideal case.

Referring to FIG. 9, in an ideal case, an SMSR is maintained constant regardless of a steering angle of reflected light. However, in a comparative example, as the steering angle of the reflected light increases, a grating lobe component increases, and thus the SMSR is greatly decreased. Accordingly, when the beam scanning apparatus according to the comparative example is used in light detection and ranging (LiDAR) and the like, noise is increased, and thus measurement accuracy may be reduced. In the present example embodiment, an SMSR of about 12 dB or greater, although slightly lower than that in the ideal case, may be maintained even when the steering angle increases.

Referring to FIG. 10, FWHMs according to steering angles in an ideal case, a comparative example, and the present example embodiments are not significantly different from one another, because an FWHM depends on the size of a beam scanning apparatus and does not greatly depend on the phase of each nano antenna.

The above-described beam scanning apparatus 100 is employed by, for example, optical apparatuses such as three-dimensional (3D) sensors (e.g., vehicle LiDAR apparatuses) and depth sensors used in 3D cameras, thereby improving the precision of the optical apparatuses.

Figure 11:
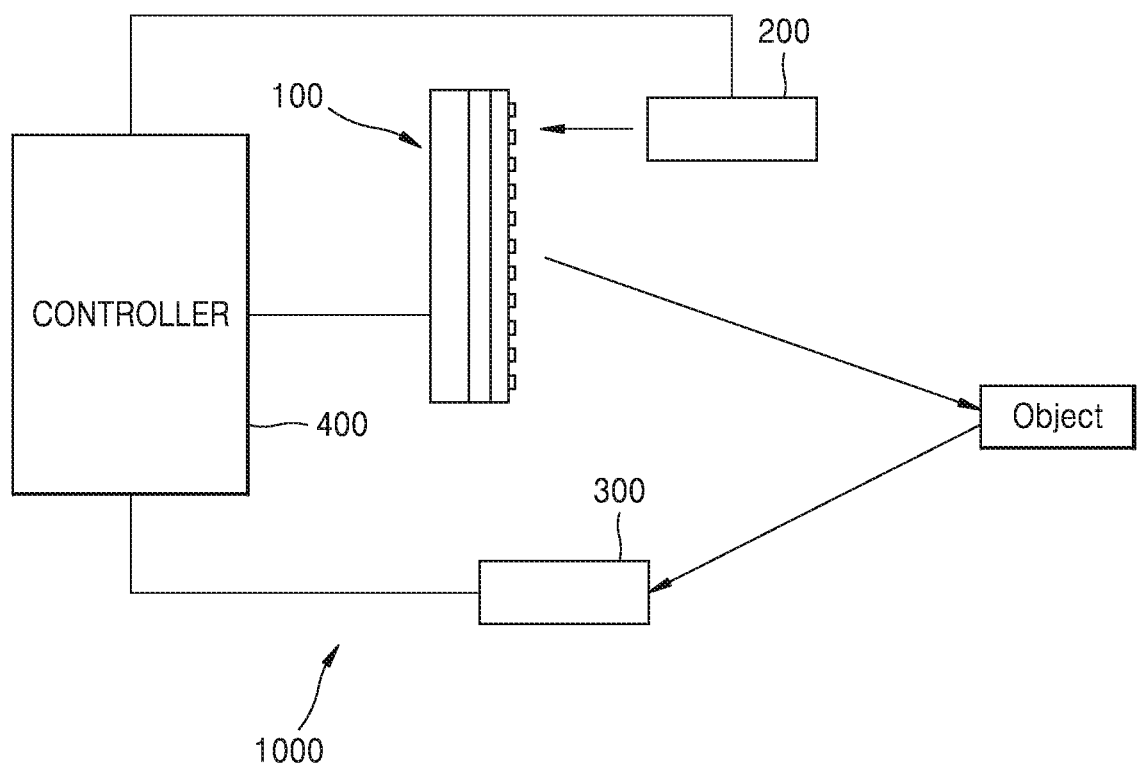
FIG. 11 is a schematic block diagram of a structure of an optical apparatus according to an example embodiment.

FIG. 11 is a schematic block diagram of a structure of an optical apparatus 1000 according to an example embodiment.

Referring to FIG. 11, the optical apparatus 1000 according to an example embodiment may include a light source 200, the beam scanning apparatus 100 radiating light emitted from the light source 200, a photodetector 300 sensing light emitted from the light source 200 and reflected by an external object, and a controller 400 calculating information about the external object, based on a result of a measurement of the sensed light that is performed by the photodetector 100. The light source 200 may be, for example, a laser diode (LD) or light-emitting diode (LED) emitting near infrared light in a band of about 800 nm to about 1500 nm. The controller 400 may control operations of the beam scanning apparatus 100, the light source 200, and the photodetector 300. For example, the controller 400 may control on/off operations of the light source 200 and the photodetector 300 and a beam scanning operation of the beam scanning apparatus 100. The optical apparatus 1000 may periodically radiate light to several areas around the optical apparatus 1000 by using the beam scanning apparatus 100, to obtain information about objects at a plurality of locations around the optical apparatus 1000. Because the performance of the beam scanning apparatus 100 according to the present example embodiment does not greatly degrade even when the steering angle increases, the optical apparatus 1000 including the beam scanning apparatus 100 may extract more accurate information about the external object.

The optical apparatus 1000 of FIG. 11 may be used in robot LiDAR apparatuses, drone LiDAR apparatuses, security intruder sensing systems, subway screen door obstacle sensing systems, face recognition sensors, motion recognition and object profiling apparatuses, and the like, in addition to 3D sensors and depth sensors. When the optical apparatus 1000 is a vehicle LiDAR apparatus, the controller 400 may calculate information about a distance between a vehicle and an object in front or at rear of the vehicle, a relative speed of the vehicle relative to the object, an azimuth location of the object, and the like. For example, the distance between the vehicle and the object may be determined using a difference between a time point when the light source 200 emits light and a time point when the photodetector 300 senses light, and the azimuth location of the object may be determined based on a location irradiated with light by the beam scanning apparatus 100. The relative speed of the vehicle relative to the object may be determined via a change in the difference between the time point when the light source 200 emits light and the time point when the photodetector 300 senses light. When the optical apparatus 1000 is a distance sensor of a 3D camera, the controller 400 may calculate distance information about distances to various objects that are within the field of view of the 3D camera.

As is traditional in the field of the inventive concepts, the example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

Although a beam scanning apparatus and an optical apparatus including the same according to the inventive concept have been described above with reference to the example embodiments illustrated in the drawings, the illustrated example embodiments are only examples, and various modifications to the illustrated example embodiments and other equivalent example embodiments may be possible. Therefore, the example embodiments may be considered in descriptive sense only and not for purposes of limitation. The scope of the inventive concept is defined not by the detailed description of the inventive concept but by the appended claims, and all differences within the scope will be construed as being included in the inventive concept.

What is claimed is:

1. A beam scanning apparatus comprising:
    a first antenna group comprising a plurality of first nano antennas disposed apart from each other;
    a first driving voltage line and a second driving voltage line connected to a first nano antenna and a second nano antenna, respectively, among the plurality of first nano antennas, the first nano antenna and the second nano antenna being respectively disposed at first ends within the first antenna group; and
    a first voltage divider configured to distribute a plurality of first voltages to one or more first middle nano antennas disposed between the first nano antenna and the second nano antenna, among the plurality of first nano antennas, at regular voltage intervals,
    wherein the first voltage divider comprises:
        a plurality of resistors serially connected to each other and connected to the first driving voltage line and the second driving voltage line, the plurality of resistors being disposed between the first driving voltage line and the second driving voltage line; and
        one or more voltage dividing lines, each of the one or more voltage dividing lines being connected from a node between two adjacent resistors, among the plurality of resistors, directly to a respective one of the one or more first middle nano antennas.

2. The beam scanning apparatus of claim 1, wherein each of the plurality of resistors has a same resistance value.

3. The beam scanning apparatus of claim 1, wherein the first driving voltage line is configured to provide a first voltage to the first nano antenna,
the second driving voltage line is configured to provide a second voltage to the second nano antenna, and
the first voltage divider is configured to distribute the plurality of first voltages between the first voltage and the second voltage to the one or more first middle nano antennas at the regular voltage intervals.

4. The beam scanning apparatus of claim 3, further comprising a driving control circuit configured to:
determine first magnitudes of the first voltage and the second voltage to be respectively applied to the first driving voltage line and the second driving voltage line, based on a direction in which a beam is to be radiated; and
apply the first voltage and the second voltage of which the first magnitudes are determined, to the first driving voltage line and the second driving voltage line, respectively.

5. The beam scanning apparatus of claim 4, further comprising:
a second antenna group comprising a plurality of second nano antennas disposed apart from each other;
a third driving voltage line and a fourth driving voltage line connected to a third nano antenna and a fourth nano antenna, respectively, among the plurality of second nano antennas, the third nano antenna and the fourth nano antenna being respectively disposed at second ends within the second antenna group; and
a second voltage divider configured to distribute a plurality of second voltages to one or more second middle nano antennas disposed between the third nano antenna and the fourth nano antenna, among the plurality of second nano antennas, at the regular voltage intervals.

6. The beam scanning apparatus of claim 5, wherein the first antenna group and the second antenna group constitute a unit cell configured to change a phase of incident light.

7. The beam scanning apparatus of claim 5, wherein the driving control circuit is further configured to:
determine second magnitudes of a third voltage and a fourth voltage to be respectively applied to the third driving voltage line and the fourth driving voltage line, based on the direction in which the beam is to be radiated; and
apply the third voltage and the fourth voltage of which the second magnitudes are determined, to the third driving voltage line and the fourth driving voltage line, respectively, and
a distribution of all voltages that are applied to the plurality of first nano antennas within the first antenna group and the plurality of second nano antennas within the second antenna group has consecutive linearity.

8. The beam scanning apparatus of claim 7, further comprising:
a third antenna group comprising a plurality of third nano antennas disposed apart from each other;
a fifth driving voltage line and a sixth driving voltage line connected to a fifth nano antenna and a sixth nano antenna, respectively, among the plurality of third nano antennas, the fifth nano antenna and the sixth nano antenna being respectively disposed at third ends within the third antenna group;
a third voltage divider configured to distribute a plurality of third voltages to one or more third middle nano antennas disposed between the fifth nano antenna and the sixth nano antenna, among the plurality of third nano antennas, at the regular voltage intervals;
a fourth antenna group comprising a plurality of fourth nano antennas disposed apart from each other;
a seventh driving voltage line and an eighth driving voltage line connected to a seventh nano antenna and an eighth nano antenna, respectively, among the plurality of fourth nano antennas, the seventh nano antenna and the eighth nano antenna being respectively disposed at fourth ends within the fourth antenna group; and
a fourth voltage divider configured to distribute a plurality of fourth voltages to one or more fourth middle nano antennas disposed between the seventh nano antenna and the eighth nano antenna, among the plurality of fourth nano antennas, at the regular voltage intervals.

9. The beam scanning apparatus of claim 8, wherein the third antenna group and the fourth antenna group constitute a unit cell configured to change a phase of incident light.

10. The beam scanning apparatus of claim 8, wherein the driving control circuit is further configured to:
apply the first voltage and the second voltage of which the first magnitudes are determined, to the fifth driving voltage line and the sixth driving voltage line, respectively, and
apply the third voltage and the fourth voltage of which the second magnitudes are determined, to the seventh driving voltage line and the eighth driving voltage line, respectively.

11. The beam scanning apparatus of claim 1, further comprising:
a conductor layer;
an active layer disposed on the conductor layer; and
an insulation layer disposed on the active layer,
wherein the plurality of first nano antennas are disposed on the insulation layer.

12. The beam scanning apparatus of claim 1, wherein a width of each of the plurality of first nano antennas is less than an operating wavelength of incident light.

13. An optical apparatus comprising:
a light source configured to emit first light;
a beam scanning apparatus configured to radiate the first light that is emitted, to an external object; and
a photodetector configured to sense second light that is reflected by the external object to which the first light is radiated,
wherein the beam scanning apparatus comprises:
a first antenna group comprising a plurality of first nano antennas disposed apart from each other;
a first driving voltage line and a second driving voltage line connected to a first nano antenna and a second nano antenna, respectively, among the plurality of first nano antennas, the first nano antenna and the second nano antenna being respectively disposed at first ends within the first antenna group; and
a first voltage divider configured to distribute a plurality of first voltages to one or more first middle nano antennas disposed between the first nano antenna and the second nano antenna, among the plurality of first nano antennas, at regular voltage intervals, and wherein the first voltage divider comprises:

a plurality of resistor serially connected to each other and connected to the first driving voltage line and the second driving voltage line, the plurality of resistors being disposed between the first driving voyage line and the second driving voltage line; and one or more voltage dividing lines, each of the one or more voltage dividing lines being connected from a node between two adjacent resistors, among the plurality of resistors, directly to a respective one of the one or more first middle nano antennas.

14. The optical apparatus of claim 13, wherein each of the plurality of resistors has a same resistance value.

15. The optical apparatus of claim 13, wherein the first driving voltage line is configured to provide a first voltage to the first nano antenna, the second driving voltage line is configured to provide a second voltage to the second nano antenna, and the first voltage divider is configured to distribute the plurality of first voltages between the first voltage and the second voltage to the one or more first middle nano antennas at the regular voltage intervals.

16. The optical apparatus of claim 15, wherein the beam scanning apparatus further comprises a driving control circuit configured to:

determine first magnitudes of the first voltage and the second voltage to be respectively applied to the first driving voltage line and the second driving voltage line, based on a direction in which a beam is to be radiated; and apply the first voltage and the second voltage of which the first magnitudes are determined, to the first driving voltage line and the second driving voltage line, respectively.

17. The optical apparatus of claim 16, wherein the beam scanning apparatus further comprises:

a second antenna group comprising a plurality of second nano antennas disposed apart from each other;

a third driving voltage line and a fourth driving voltage line connected to a third nano antenna and a fourth nano antenna, respectively, among the plurality of second nano antennas, the third nano antenna and the fourth nano antenna being respectively disposed at second ends within the second antenna group; and a second voltage divider configured to distribute a plurality of second voltages to one or more second middle nano antennas disposed between the third nano antenna and the fourth nano antenna, among the plurality of second nano antennas, at the regular voltage intervals.

18. The optical apparatus of claim 17, wherein the first antenna group and the second antenna group constitute a unit cell configured to change a phase of incident light.

19. The optical apparatus of claim 17, wherein the driving control circuit is further configured to:

determine second magnitudes of a third voltage and a fourth voltage to be respectively applied to the third driving voltage line and the fourth driving voltage line, based on the direction in which the beam is to be radiated; and apply the third voltage and the fourth voltage of which the second magnitudes are determined, to the third driving voltage line and the fourth driving voltage line, respectively, and a distribution of all voltages that are applied to the plurality of first nano antennas within the first antenna group and the plurality of second nano antennas within the second antenna group has consecutive linearity.

20. The optical apparatus of claim 13, further comprising a controller configured to determine information of a location of the external object, based on a result of a measurement of the second light that is sensed, the measurement being performed by the photodetector.

21. A beam scanning apparatus comprising:

a plurality of nano antennas disposed apart from each other;

a first driving voltage line connected to a first nano antenna among the plurality of nano antennas, and configured to provide a first voltage to the first nano antenna;

a second driving voltage line connected to a second nano antenna among the plurality of nano antennas, and configured to provide a second voltage to the second nano antenna; and a voltage divider disposed between the first driving voltage line and the second driving voltage line and connected to the first driving voltage line and the second driving voltage line, the voltage divider being configured to provide a third voltage to a middle nano antenna disposed between the first nano antenna and the second nano antenna, among the plurality of nano antennas, wherein magnitudes of the first voltage, the second voltage and the third voltage that are provided are linearly decreasing from the first voltage to the third voltage, and wherein the voltage divider comprises:

a plurality of resistors serially connected to each other and connected to the first driving voltage line and the second driving voltage line, the plurality od resistors being disposed between the first driving voltage line and the second driving voltage line; and a voltage dividing line connected from a node between two adjacent resistors, among the plurality of resistors, directly to the middle nano antenna.

22. The beam scanning apparatus of claim 21, wherein a phase shift of light incident on the beam scanning apparatus linearly decreases according to a position of the plurality of nano antennas.

* * * * *